United States Patent
Burke et al.

(10) Patent No.: US 11,618,017 B2
(45) Date of Patent: Apr. 4, 2023

(54) SQUEEZABLE SAMPLE PREPARATION DEVICE

(71) Applicant: Porex Corporation, Fairburn, GA (US)

(72) Inventors: Asa C. Burke, Decatur, GA (US); Rene Desquenne, Aachen (DE); Guoqiang Mao, Smyrna, GA (US)

(73) Assignee: Porex Corporation, Fairburn, GA (US)

( * ) Notice: Subject to any disclaimer, the term of this patent is extended or adjusted under 35 U.S.C. 154(b) by 0 days.

(21) Appl. No.: 17/851,783

(22) Filed: Jun. 28, 2022

(65) Prior Publication Data

US 2023/0001405 A1 Jan. 5, 2023

Related U.S. Application Data

(60) Provisional application No. 63/217,553, filed on Jul. 1, 2021.

(51) Int. Cl.
*B01L 3/00* (2006.01)
*B01L 3/02* (2006.01)
*B01D 39/16* (2006.01)

(52) U.S. Cl.
CPC ........ *B01L 3/0275* (2013.01); *B01D 39/1661* (2013.01); *B01L 2300/048* (2013.01); *B01L 2300/049* (2013.01); *B01L 2300/0681* (2013.01)

(58) Field of Classification Search
CPC ............ B01L 3/0275; B01L 2300/048; B01L 2300/049; B01L 2300/0681; B01D 39/1661
USPC ......................................................... 422/198
See application file for complete search history.

(56) References Cited

U.S. PATENT DOCUMENTS

| | | | | |
|---|---|---|---|---|
| 3,757,782 A | * | 9/1973 | Aiken | A61F 13/38 604/3 |
| 5,308,180 A | * | 5/1994 | Pournoor | B01D 69/02 604/3 |
| 5,607,766 A | * | 3/1997 | Berger | A24D 3/08 428/36.9 |
| 6,101,181 A | | 8/2000 | Passint et al. | |
| 6,817,801 B1 | * | 11/2004 | Colburn | A47L 1/15 401/6 |
| 6,840,692 B2 | | 1/2005 | Ward et al. | |
| 7,729,668 B2 | | 6/2010 | Leffel | |
| 8,141,717 B2 | | 3/2012 | Wingo et al. | |

(Continued)

FOREIGN PATENT DOCUMENTS

WO    2013/067520 A1    5/2013
WO    2021242768 A1    12/2021

OTHER PUBLICATIONS

PCT Patent Application No. PCT/US2022/035291, International Search Report and the Written Opinion, dated Oct. 25, 2022, 10 pages.

*Primary Examiner* — Christine T Mui
(74) *Attorney, Agent, or Firm* — Kilpatrick Townsend & Stockton LLP

(57) ABSTRACT

An improved biological sample preparation device and method of using the device, the device including a squeezable tube and a tip assembled to the squeezable tube. The tip includes a filter and a wick configured to enable controlled delivery to a diagnostic device by capillary action. The device provides precise and repeatable sample volume dispensing control, reduces potential contamination in the working environment, increases ease of use, and improves safety for healthcare workers.

11 Claims, 9 Drawing Sheets

(56) References Cited

U.S. PATENT DOCUMENTS

| | | |
|---|---|---|
| 8,187,534 B2 | 5/2012 | Mao |
| 8,201,564 B2 * | 6/2012 | McHugh .............. A24D 3/0212 493/44 |
| 9,330,580 B2 | 5/2016 | Ward et al. |
| 2018/0136194 A1 | 5/2018 | Sinn et al. |

* cited by examiner

SQUEEZABLE SAMPLE PREPARATION DEVICE

This application claims the benefit of U.S. Provisional Application Ser. No. 63/217,553, filed Jul. 1, 2021, titled "Squeezable sample preparation device and method," the entire contents of which are hereby incorporated by reference.

FIELD OF THE DISCLOSURE

Embodiments of the present disclosure relate generally to an improved biological sample preparation device and method of using the device. The disclosed device provides improved sample volume control, reduces potential contamination in the working environment, and improves safety for healthcare workers.

BACKGROUND

In the healthcare arena, it is often necessary to collect a biological sample, and demand is increasing for easier collection methods to be used at the point of care or at the subject's home. In some instances, the sample is mixed with buffer and tested directly. In other instances, these may need to be transported to a testing environment. In most cases, it can be necessary to provide a controlled release of the collected sample onto a target device or other testing substrate. Some examples use dropper devices that are intended to be squeezed and allocate the sample, drop-by-drop, out of a nozzle or outlet. Such dropper devices can cause more than one drop to exit at a time, creating a flooding situation of the target device or other testing substrate. Drops of sample can also cause contamination and safety concerns if they are released accidentally or if the target is missed, and these risks increase with inexperienced, non-clinical users outside of traditional lab environments. Accordingly, improved sample preparation devices are desirable.

BRIEF SUMMARY

Embodiments of the present disclosure provide a squeezable sample device that functions as a biological sample preparation device. The device has a liquid tube that delivers a collected liquid sample contained in the compartment through a filter and then into a porous wick for capillary delivery to a target device or other testing substrate. The porous wick may be secured to the liquid tube via a tip assembly that secures the filter and porous wick in place. The tip assembly may define a liquid flow channel therethrough, with two openings (one opening end of the tip assembly secures to the liquid tube and the other opening end secures/attaches a porous wick). The tip assembly may also have at least one filter positioned in the liquid flow channel, which can help filter out any particulates from the biological sample before it is absorbed into the porous wick. The liquid tube generally has an upper opening that receives the tip assembly.

In one example, there is provided a sample preparation device, comprising: a liquid tube; and a tip assembly cooperable with the liquid tube, the tip assembly supporting a filter and a porous wick, wherein the porous wick is secured at a tip end opening of the tip assembly, and at least one air vent channel positioned along sides of the porous wick.

In any of the above or subsequent examples, the device may further comprise an air gap between the filter and the porous wick.

In any of the above or subsequent examples, the filter may comprise sintered porous plastics, glass fibers, cellulose filters, synthetic fibers, reverse phase porous membrane, or any combinations thereof.

In any of the above or subsequent examples, the porous wick may comprise sintered porous media, bonded porous fiber media, open cell foams, or any combinations thereof.

In any of the above or subsequent examples, the tip body of the device may have at least one air vent channel which may comprise three equidistant vent channels.

In any of the above or subsequent examples, the liquid tube and the tip assembly cooperate via threaded connection, snap fit connection, or friction fit connection. In any of the above or subsequent examples, the porous wick is friction fit into the tip end opening of the tip assembly.

In any of the above or subsequent examples, the device may further comprise a one-way valve positioned in the tip assembly.

In any of the above or subsequent examples, the liquid tube may comprise flexible side walls.

In any of the above or subsequent examples, the liquid tube may comprise one or more ribs to prevent stuck nesting of multiple liquid tubes.

In any of the above or subsequent examples, the filter and the porous wick both comprise a bonded nonwoven fiber material.

In any of the above or subsequent examples, the device may be used via a method comprising:
(a) collecting a sample in the liquid tube;
(b) positioning the tip assembly over an open end of the liquid tube;
(c) squeezing flexible sides of the liquid tube in order to force collected sample through the filter and into the porous wick;
(d) releasing pressure from the liquid tube, with the device allowing the wick to remain saturated;
(e) delivering a controlled volume via the porous wick to a testing substrate by direct contact and capillary draw.

DETAILED DESCRIPTION

Figure 1:
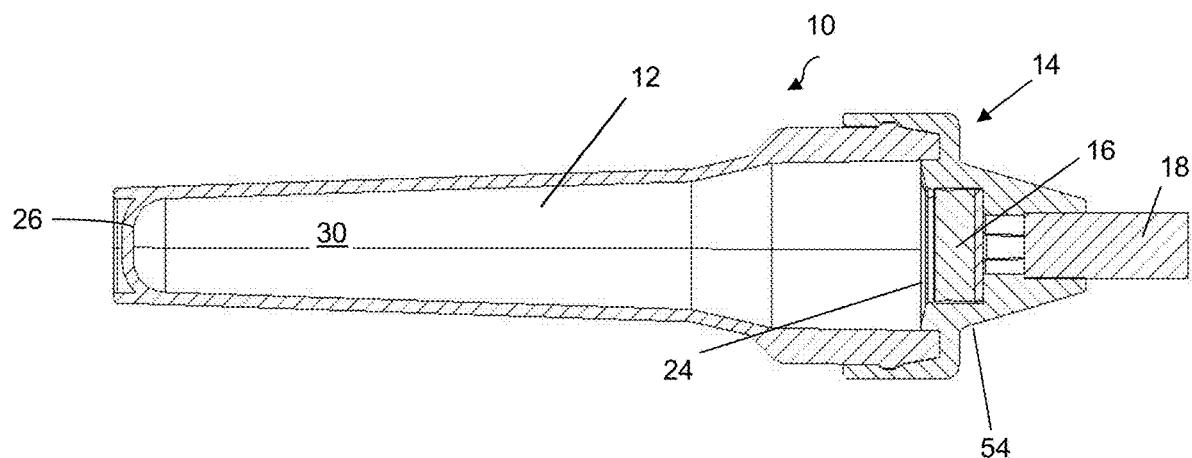
FIG. 1 shows a side cross-sectional view of one embodiment of a squeezable sample preparation device of this disclosure.
Figure 2:
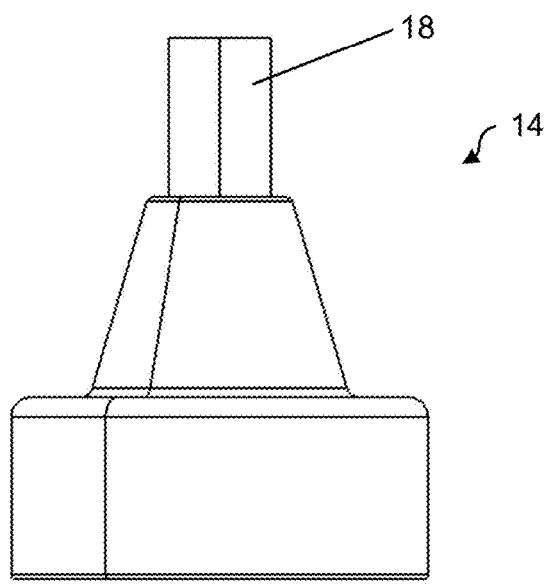
FIG. 2 shows a side plan view of one embodiment of a tip assembly.
Figure 3:
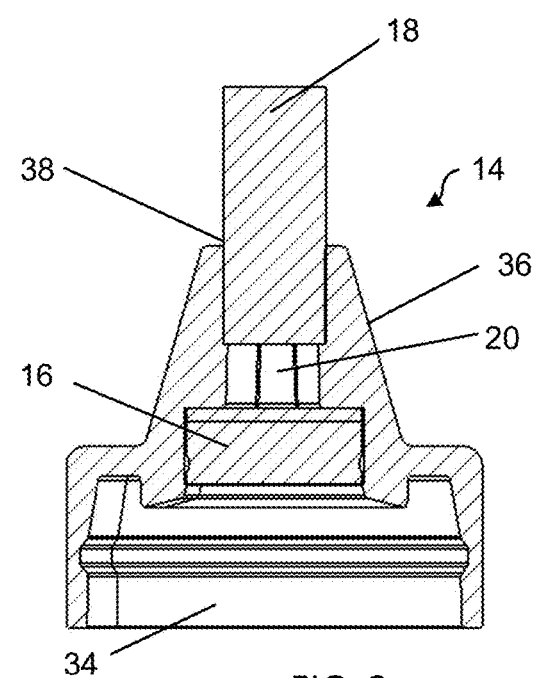
FIG. 3 shows a side cross-sectional view of the tip assembly of FIG. 2.
Figure 4:
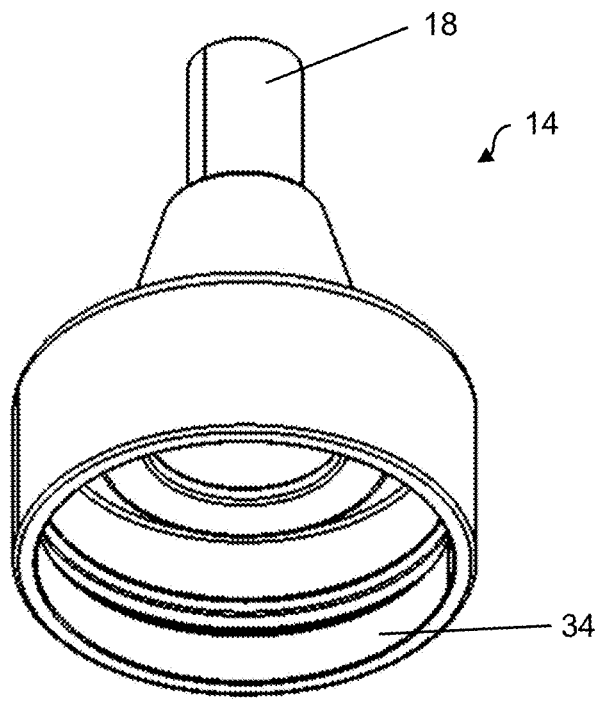
FIG. 4 shows a bottom perspective view of the tip assembly of FIG. 2.
Figure 5:
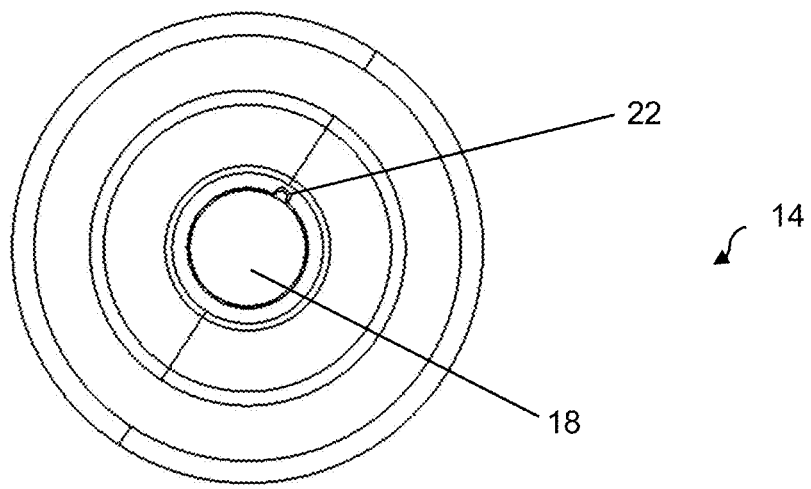
FIG. 5 shows a top plan view of the tip assembly of FIG. 2.
Figure 6:
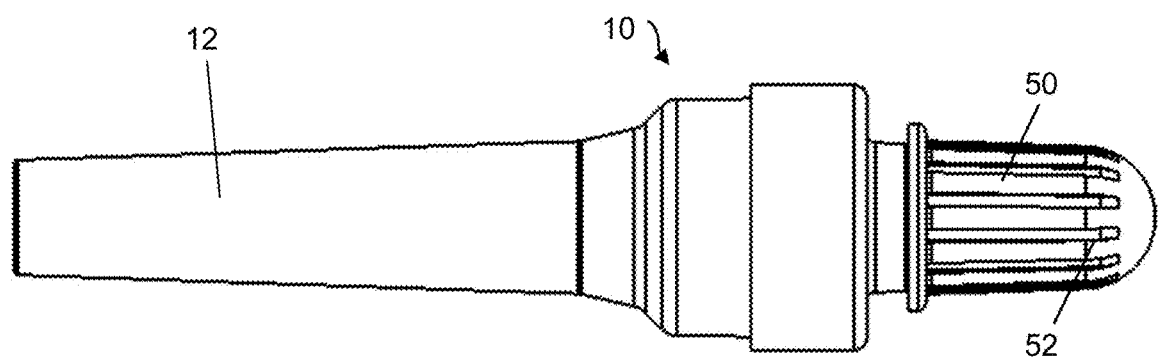
FIG. 6 shows a side plan view of an alternate embodiment of a squeezable sample preparation device of this disclosure.
Figure 7:
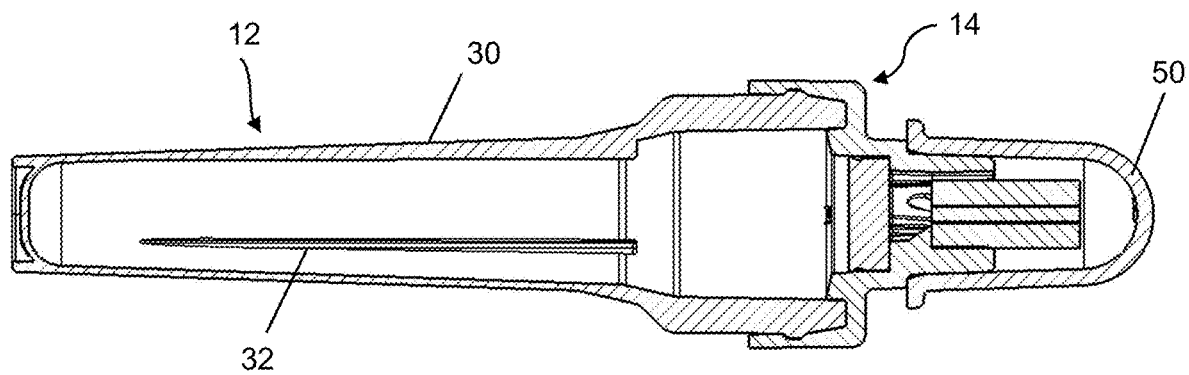
FIG. 7 shows a side cross-sectional view of the device of FIG. 6.
Figure 8:
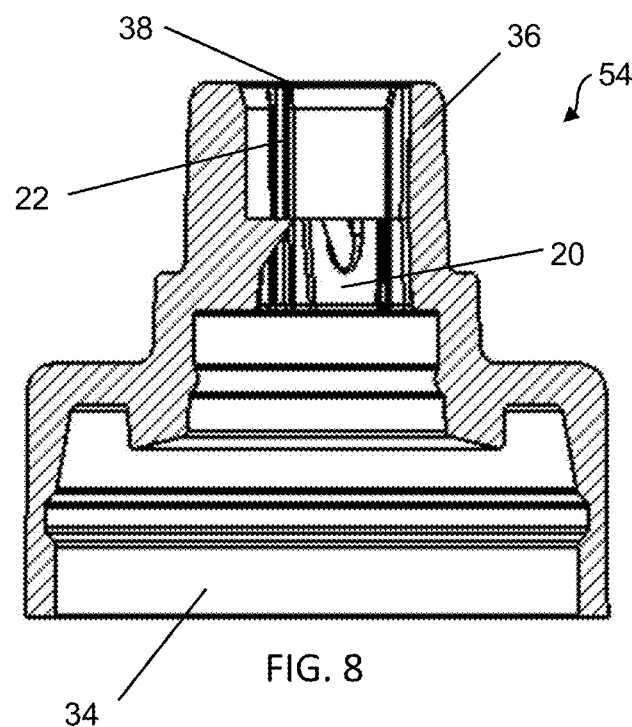
FIG. 8 shows a side plan cross-sectional view of one embodiment of a tip body without the porous components.
Figure 9:
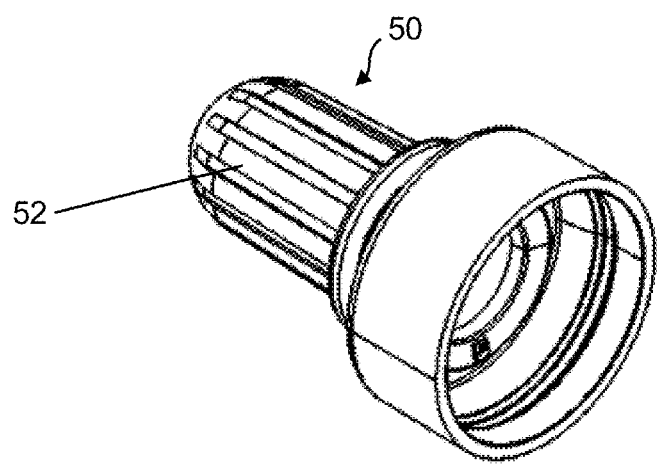
FIG. 9 shows one embodiment of a cap that may be used with the devices of this disclosure, together with a tip assembly.
Figure 10:
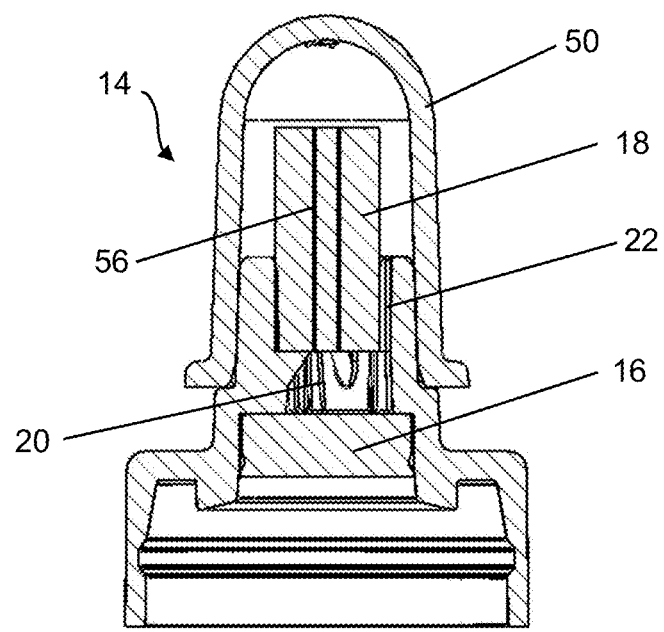
FIG. 10 shows a side cross-sectional view of the tip assembly with cap of FIG. 9.

Embodiments of the present disclosure provide a squeezable device 10 that can be used to prepare a biological sample. The device 10 is made up of a squeezable liquid tube 12 and a tip assembly 14. The tip assembly 14 is made up of a tip body 54 which supports a filter 16 and a porous wick 18. The tip assembly 14 also defines an air gap 20 between the filter 16 and the wick 18 and at least one air vent channel 22. As described in more detail below, it is also possible to provide a cap 50 that fits over the tip assembly 14 in order to protect the porous wick 18 during shipping, prevent drying out of the components and/or the collected sample, and to assist end-user placement of the tip assembly 14 onto the liquid tube 12 after sample collection without damaging the porous wick 18.

Liquid Tube

Exemplary liquid tubes are illustrated by FIGS. 1, 6, 7, 11, and 12. The liquid tube 12 is generally sized and configured to contain a biological sample. The liquid tube 12 may also contain any other type of liquid necessary for testing, including but not limited to a buffer, an aqueous solution, an organic solution, any other appropriate solution, or any combination thereof. The liquid tube 12 may be provided with one open end 24 and one closed end 26. The open end 24 receives the open end 34 of tip assembly 14. In one example, one or more threads may be positioned around the open end 24 which can receive corresponding threads of the tip assembly 14. Alternatively, it is possible for the tip assembly 14 to snap fit onto the open end 24 of the liquid tube 12. Alternatively, it is possible for the tip assembly 14 to friction fit onto the open end 24 of the liquid tube 12. Side walls 30 of the liquid tube 12 may be flexible, such that a user can squeeze the side walls 30 and force solution contained within the liquid tube out through the open end 24.

Figure 12:
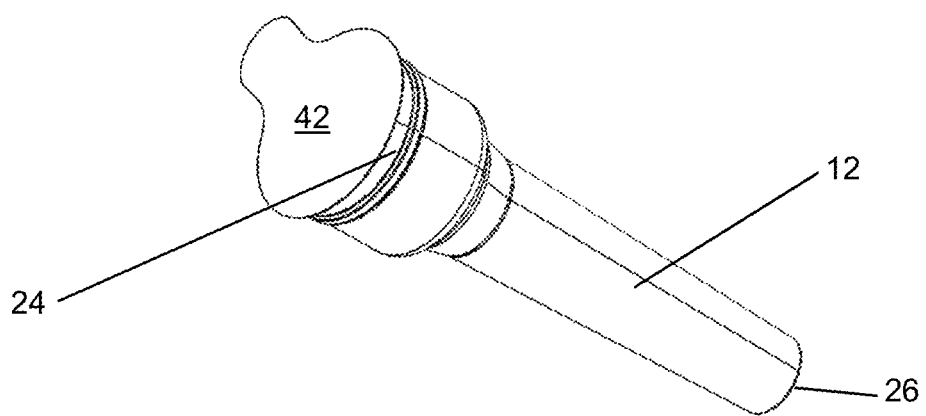
FIG. 12 shows a side perspective view of one embodiment of a pre-sealed liquid tube.
Figure 13:
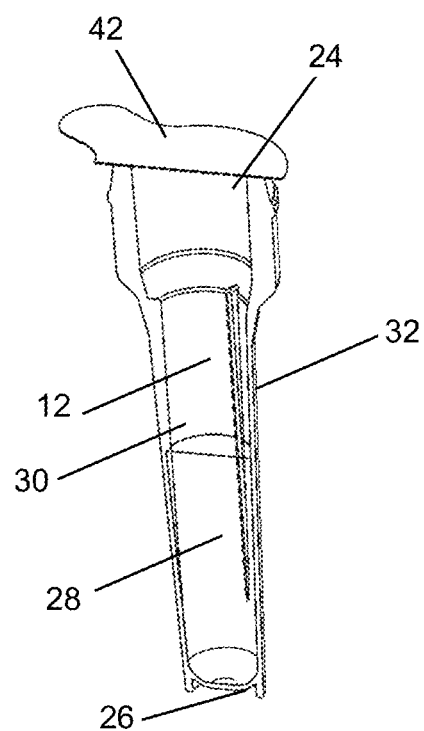
FIG. 13 shows a front perspective cross-sectional view of the pre-sealed liquid tube of FIG. 12.

These liquid tube 12 may be provided pre-sealed (e.g., with a foil seal or other type of sealing mechanism 42) with solution 28, such as a buffer solution, dilution solution, a reagent solution or any other appropriate biological sample preservation solution. Examples of pre-sealed tubes are illustrated by FIGS. 12 and 13. In other embodiments, the practitioner may mix a biological sample with buffer and that entire solution may be inserted into the liquid tube.

In some examples, the liquid tube 12 may have one or more volume marks (not shown) along its side walls 30, indicating to a user how much sample has been collected (or needs to be collected). In some embodiments, the liquid tube 12 may be provided with a venting hole in the closed end containing a one-way valve to allow the tube to re-fill with outside pressure after compressing, and/or a hydrophobic venting design allowing pressure equalization but not solution egress. It is possible for the liquid tube 12 to have one or more ribs 32 along either an interior surface and/or along an exterior surface in order to prevent nesting of empty tubes before their use, which would hinder automated sorting into assembly equipment.

Tip Assembly

FIGS. 2-5 illustrate one embodiment of an exemplary tip assembly 14. This embodiment includes a single air vent channel 22. FIGS. 8-11 illustrate an alternate embodiment of an exemplary tip assembly 14. This embodiment includes three air vent channels 22 and a covering cap 50. The tip body 54 of the tip assembly 14 is shown as having two ends. A first open end 34 is configured to cooperate with the open end 24 of the buffer compartment 12. This cooperation may be via a threaded connection, via a snap fit connection, via a friction fit connection, or any other appropriate connection. A second tip end 36 supports a porous wick 18. The porous wick 18 is generally press fit snugly into opening 38 at second tip end 36. It should be understood however, that other securement options between the porous wick 18 and the tip body 54 are possible and considered within the scope of this disclosure. For example, a ribbed/slot groove option may be used, or any other appropriate connection. The connection end of the wick 18 is generally shaped to correspond to the opening shape 38. This may be a circular shape, a flat shape, a wedge shape, an angular shape, or any other appropriate shape option.

Further features of the porous wick 18, including various wick shapes and cross section options, are described in more detail below, but in general, the porous wick 18 is provided in order to control the liquid delivery flow, speed, and volume. The tip assembly 14 may also contain a filter 16, features of which are also described in more detail below. In general, the filter 16 is provided in order to filter any particulates from the sample solution before it moves to and into the porous wick 18.

Figure 11:
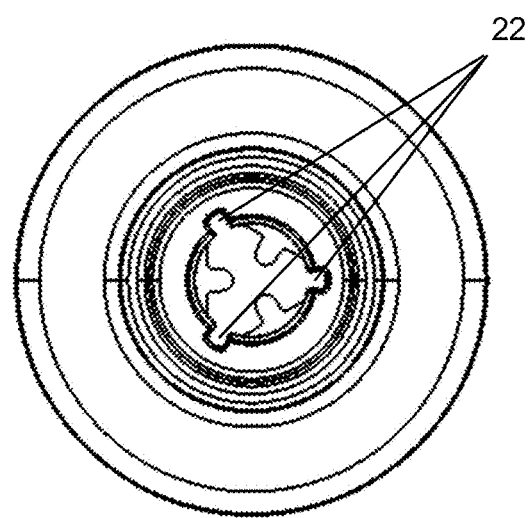
FIG. 11 shows a top plan view of the tip body of FIG. 8.

In one specific embodiment, the tip assembly 14 comprises at least one air vent channel 22 along the side of the porous wick 18. This is illustrated by the top plan view of FIG. 5. In an alternate embodiment, the tip assembly comprises more than one air vent channel 22 along the side of the porous wick 18. This is illustrated by the top plan view of FIG. 11. FIG. 11 shows three air vent channels 22, but it should be understood that fewer or more channels 22 may be used, depending upon the size of the device, the viscosity of the sample, or other parameters. After the squeezing action, the air vent channel(s) 22 allows return air to pass around the porous wick 18 and reach the liquid tube 12, while the porous wick 18 remains saturated with liquid. The location of the air vent channel(s) 22 along only the porous wick section 18 as shown prohibits bypass of the filter(s) 16 during squeezing pressurization. Squeezing the liquid tube 12 after attaching a tip assembly 14 and inverting creates pressure and pushes the sample through the filter and across air gap 20 to saturate the porous wick 18.

It is possible for the air vent channel(s) 22 to have a circular or semicircular shape. It is possible for the air vent channel 22 to have a leaf-like or lobed shape as shown by FIG. 11. This version has been found useful because if one of the vents becomes occluded with fluid or is otherwise inoperable, there is still an air path available. It is possible for the air vent channel(s) 22 to be equally spaced around the porous wick 18 as shown. In alternate embodiments, they may be unevenly spaced. The general goal of the air vent channel(s) 22 is to provide a way to release pressure from the liquid tube and enable incoming/return air to flow around the porous wick 18 without fluid flowing back in to the liquid tube from the saturated porous wick 18. This allows the user to handle the device after wick saturation without applying constant pressure.

Filter

The tip body 54 of tip assembly 14 also supports a filter 16. The filter 16 is generally a porous material that can help remove particulates from the collected biological sample. Exemplary filters that may be used in connection with this disclosure include but are not limited to sintered porous plastics, glass fibers, cellulose filters, synthetic fibers, reverse phase porous membrane, or any combinations thereof. In a specific example, the filter 16 is a bonded nonwoven fiber material. The filter 16 may generally function as a traditional filter, removing particles that may be contained in the solution in the liquid tube and preventing them from passing into the porous wick 18. The filter may function as affinity filters to remove interference materials for the down-stream assays. The interference materials could be, but are not limited to, colorants, cells, polysaccharides, lipids, DNA or RNA fragments or proteins, or any combinations thereof. The filter may be received at the open end 34 of the tip assembly 14. In a specific example, the filter is shaped as a disc. The filter 16 may be friction fit into place, fit into a groove, or positioned via any other securement method.

Porous Wick

The tip assembly 14 also supports a porous wick 18. Exemplary porous wicks that may be used in connection with the present disclosure include but are not limited to sintered porous media, bonded porous fiber media, open cell foams, or any combinations thereof. In a specific example, the porous wick 18 is a bonded nonwoven fiber material. Sintered porous media could be the sintered porous media described in U.S. Pat. No. 8,141,717; porous fiber wicks could be the porous fiber media described in the U.S. Pat. Nos. 6,101,181; 6,840,692; and/or 7,729,668. Open cell foams could be polyurethane foams. Any combinations of these materials or other appropriate materials are possible. It is also possible to provide a device with a plurality of different types of porous wicks. For example, the squeezable sample preparation device may be provided as a kit with different wick options for the practitioner to consider based on factors such as sample type and quantity.

Figure 15:
FIG. 15 shows exemplary options for a wick cross-section.

The porous wick may have any appropriate cross-sectional shape. FIG. 15 illustrates various non-limiting options for the wick cross-section. As shown, the wick cross section may be circular, oval, square, rectangular, triangular, star-shaped, pentagon-shaped, hexagonal, or have any other appropriate number of sides or perimeter shapes. If the wick's cross-section is circular, the vents can be part of the molded tip body 54 structure, such that the tip open end 38 has a tri-lobed shape, as illustrated by FIG. 11. If the wick's cross-sectional shape is not circular, the tip open end 38 may be formed as circular, and venting channels 22 may be formed between the wick 18 and the tip body 54. The general goal is to allow venting between the liquid tube 12 and the porous wick 18.

Figure 16:
FIG. 16 shows exemplary options for functional end of the wick to be formed at any angle.

FIG. 16 illustrates various non-limiting options for the wick longitudinal shape. As shown, the wick may be rod-shaped with a blunt end. Alternatively, the wick may have an angular cut at its end. This angled shape may help ease usage for the user. It should also be understood that is possible for the wick to have a rounded end (not shown) or any other appropriate end shape.

The porous wicks in present disclosure may optionally further comprise a color changing indicating zone 56. The color changing zone 56 may be used to indicate sufficiency of liquid amount. The wick may incorporate color-changing properties described in U.S. Pat. Nos. 8,187,534 and/or 9,330,580.

In one arrangement, the porous wick 18 may be in physical and direct contact with the filter 16 in the tip assembly. Alternatively, the wick 18 and filter 16 may be separated by a spacer or have a designed air gap 20. The spacer or gap can prevent the back flow of liquid from the wick 18 to the filter 16 by capillary draw or from any vacuum created when squeezing action stops, the flexible side walls 30 decompress, and or the liquid tube 12 repressurizes. This air gap 20 can work in tandem with the air venting channel 22. In one specific example, they tip assembly 14 may be provided with one or more ledges on which the porous wick 18 will sit/fit in order to preserve an air gap 20 therebetween.

As shown by FIGS. 6, 7, 9, and 10, it is also possible to provide a cover cap 50 to protect the wick 18. In the example shown, the cap 50 is provided with a knurled surface 52 which can help the practitioner remove the cap 50 and expose the porous wick 18. The cap 50 may fit over the tip body 54 via a threaded connection, a snap fit connection, via a friction fit connection, or any other appropriate securement system.

Sample Options

The disclosed device 10 could be used for both solid and liquid samples, as long as the targeted materials are soluble in the liquid solution contained or provided in the liquid tube. This device is particularly suitable for biological samples, such as blood, saliva, nasal, urea or stool which may contain infective materials, such as viruses or bacteria.

Method of Use

In use of the device 10, a biological sample will be collected in the liquid tube 12. It is generally envisioned that the liquid tube 12 will be provided with buffer, reagent, or some other type of solution contained therein, which is intended to be mixed with the collected sample. One of ordinary skill in the art will understand various types of buffers or solutions that may be used in connection with this disclosure. The tip assembly 14 is then assembled onto the liquid tube 12. At this point, it is possible to shake the device in order to mix the sample and buffer together. The sides of the liquid tube may be squeezed in order to dispense solution out through the filter 16 and into the porous wick 18 of the tip assembly 14.

The present disclosure also provides a method of delivering a liquid sample to a target device comprising the process of squeezing the liquid tube, pushing the collected sample/liquid/buffer solution in the liquid tube through the filter(s) 16, saturating the porous wick 18 with the liquid from the liquid tube, and applying the liquid in the porous wick to a down-stream analysis device via capillary draw. In use, a practitioner may remove the tip assembly 14 and put a biological sample into the liquid tube. If the liquid tube 12 is provided with a buffer or other reagent solution, the sealing mechanism 42 would be removed and sample added, causing the sample to dissolve and transfer analytes from the collected sample into the liquid contained in the liquid tube 12. In an alternate embodiment, the practitioner may have already mixed the biological sample with a solution and may pour the entire sample/buffer solution mix into the liquid tube 12. The tip assembly 14 may be already placed over the liquid tube 12 when initially provided to the user, or the two may be provided as separate components to combine in final use. Presence of the filter 16 can help filter out any solid particles that may be present in the biological sample. Then, pressure from the liquid tube forces the sample through the filter 16 and into and through the porous wick 18. The practitioner may deliver a sample from the saturated wick 18 by direct physical contact and capillary draw onto the assay, sample receptacle area, or whatever end product is being used to further test the sample. Presence of the porous wick 18 allows for direct delivery of sample by an unbroken fluid path rather than by dropping sample through the air. Sample volume and delivery speed are controlled by the porosity characteristics of the wick and the receiving component.

In currently available products, there is not a wick provided, instead, practitioner simply squeezes the sample out through a tip as droplets. However, this can cause liquid to come out too quickly, preventing an appropriate sample size from being delivered. Also, drops can miss the targeted receptacle due to user error and can require high dexterity, resulting in possible contamination and safety risks from potentially hazardous biological samples. Additionally or alternatively, when pressure is released from the liquid tube, this can cause the sample to be sucked back into the prior art devices. By contrast, providing the porous wick 18 of the present disclosure combined with the air gap 20 and air vent channels 22 helps to hold the liquid and prevent it from leaking or shooting out, or otherwise exiting the liquid tube too quickly. It also prevents the sample and/or air from being suctioned backed into the device 10 when pressure is released.

Use of the disclosed porous wicks 18 with device 10 can help prevent liquid sample spillage caused by over-squeezing the liquid tube. The porous wicks 18 can also provide an easy operation for the operators with different physical strength or dexterity and provide more consistent results. The device design controls sample delivery rate and quantity and does not require the user to physically observe and control any instructed quantity of sample droplets which are difficult to create and see.

One-Way Valve

Figure 14:
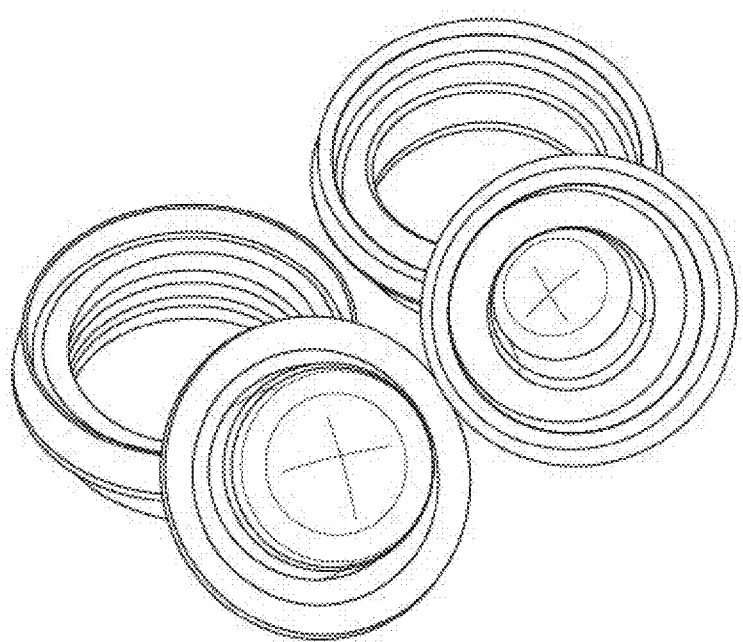
FIG. 14 shows exemplary one-way valves that may be used in connection with this disclosure.

Another embodiment of present disclosure provides a biological sample preparation device that further includes a one-way valve in the middle of the liquid flow channel in the tip assembly. As described above, the tip assembly 14 can comprise an air vent channel 22, which allows the air to pass around the porous wick 18 and into the liquid tube after the squeezing action. Use of a one-way valve may help manage a biological sample that has particulates or solids contained therein. The one-way valve may be an elastic component, a disk, or any other appropriate configuration. Exemplary options are illustrated by FIG. 14. It may have a concave surface on one side and a convex surface on the other side. It may have a cross (or other cut out shape) that allows fluid to move in one direction when there is a pressure drop in one direction, but not in the opposite direction. The concave surface typically faces the closed end of the liquid tube and the convex surface faces the wick. Liquid can only flow from the concave to the convex direction when a pressure is applied. When using the one-way mechanical valve, the porous wick may function both as the filter and the wick by delivering the liquid and removing the solid composition in the liquid samples. Using a one-way valve also allows for the device to not include a filter, and still allow shaking of the sample for mixing after the tip assembly is attached to the liquid tube containing sample.

The present disclosure also provides a method of delivering a liquid sample to the target device comprising the process of squeezing the compartment, pushing the liquid in the squeezing compartment through the one-way valve, saturating the porous wick with the liquid in the liquid tube and applying the liquid in the porous wick to a down-stream analysis device.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Changes and modifications, additions and deletions may be made to the structures and methods recited above and shown in the drawings without departing from the scope or spirit of the invention disclosure and the following claims.

What is claimed is:

1. A biological sample preparation device, comprising:
a squeezable liquid tube; and
a tip assembly cooperable with the liquid tube, the tip assembly supporting a filter and a porous wick, wherein the porous wick is secured at a tip end opening of the tip assembly, at least one air vent channel positioned along a side of the porous wick and an air gap between the filter and the porous wick, wherein the at least one air vent channel connects to the air gap.

2. The device of claim 1, wherein the filter comprises sintered porous plastics, glass fibers, cellulose filters, synthetic fibers, reverse phase porous membrane, or any combinations thereof.

3. The device of claim 1, wherein the porous wick comprises sintered porous media, bonded porous fiber media, open cell foams, or any combinations thereof.

4. The device of claim 1, wherein the at least one air vent channel comprises three equidistant vent channels.

5. The device of claim 1, wherein the liquid tube and the tip assembly cooperate via threaded connection, snap fit connection, or friction fit connection.

6. The device of claim 1, wherein the porous wick is friction fit into the tip end opening of the tip assembly.

7. The device of claim 1, further comprising a one-way valve positioned in the tip assembly.

8. The device of claim 1, wherein the liquid tube comprises flexible side walls.

9. The device of claim 1, wherein the liquid tube comprises one or more ribs to prevent stuck nesting of multiple liquid tubes.

10. The device of claim 1, wherein the filter and the porous wick both comprise a bonded nonwoven fiber material.

11. A method of using the device of claim 1, comprising:
(a) collecting a sample in the liquid tube;
(b) positioning the tip assembly over an open end of the liquid tube;
(c) squeezing flexible sides of the liquid tube in order to force collected sample through the filter and into the porous wick;

(d) releasing pressure from the liquid tube, with the device allowing the wick to remain saturated;
(e) delivering a controlled volume via the porous wick to a testing substrate by direct contact and capillary draw.

* * * * *